(12) United States Patent
Olsson et al.

(10) Patent No.: US 11,061,299 B1
(45) Date of Patent: *Jul. 13, 2021

(54) UNDERWATER VIDEO HOUSINGS AND IMAGING SYSTEMS WITH LIGHT CONTAMINATION MITIGATION

(71) Applicant: SeeScan, Inc., San Diego, CA (US)

(72) Inventors: Mark S. Olsson, La Jolla, CA (US); Eric M. Chapman, Lake Tapps, WA (US); Aaron J. Steiner, San Diego, CA (US); Jon E. Simmons, Poway, CA (US); Steven C. Tietsworth, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,807

(22) Filed: Aug. 19, 2019

Related U.S. Application Data

(63) Continuation of application No. 16/102,645, filed on Aug. 13, 2018, now Pat. No. 10,394,106.

(60) Provisional application No. 62/561,144, filed on Sep. 20, 2017, provisional application No. 62/545,953, filed on Aug. 15, 2017.

(51) Int. Cl.
  *G03B 15/03* (2021.01)
  *G02B 6/00* (2006.01)
  *G03B 17/08* (2021.01)
  *F21V 8/00* (2006.01)

(52) U.S. Cl.
  CPC .......... *G03B 15/03* (2013.01); *G02B 6/0008* (2013.01); *G03B 17/08* (2013.01)

(58) Field of Classification Search
  None
  See application file for complete search history.

(56) References Cited

U.S. PATENT DOCUMENTS

| | | | |
|---|---|---|---|
| 4,802,460 A * | 2/1989 | Ohkuwa | A61B 1/00096 385/117 |
| 10,394,106 B1 * | 8/2019 | Olsson | G03B 17/08 |
| 2007/0205357 A1 * | 9/2007 | Tanaka | G06K 9/00033 250/227.14 |
| 2009/0027497 A1 * | 1/2009 | Peacock | H04N 5/2252 348/143 |
| 2012/0010465 A1 * | 1/2012 | Erikawa | A61B 1/05 600/109 |
| 2012/0121245 A1 * | 5/2012 | Messina | G03B 15/03 396/199 |
| 2014/0043527 A1 * | 2/2014 | Lu | G06K 9/00046 348/362 |
| 2019/0101680 A1 * | 4/2019 | Tsujikawa | G02B 6/0001 |

* cited by examiner

Primary Examiner — William B Perkey
(74) Attorney, Agent, or Firm — Steven C. Tietsworth, Esq.; Michael J. Pennington, Esq.

(57) ABSTRACT

An integrated underwater imaging device includes a housing with a transparent optical port, a camera and one or more LED light sources with optically coupled to light pipes within the housing. The optical port includes light mitigation features to reduce internal light contamination from the LED light sources on the imager of the camera.

20 Claims, 8 Drawing Sheets

Details of One Port Retaining Element Embodiment

Details of One Rubber Optical Attenuation Element Embodiment

Details of One Embodiment of An Integral Transparent Optical Port

*Details of One Embodiment of The Forward Portion of a Housing*

*Exploded View of Area 121 of FIG. 5A and 5B*

Details of One Embodiment of An Integrated Housing with Lighting and Video

Exploded View of the Integrated Housing Embodiment of FIG. 7

Details of The Internal Configuration of the Integrated Housing
Embodiment of FIG. 7 and 8

*Details of One Embodiment of A Lip Feature for Retaining an Optical Attenuation Material to a Port*

UNDERWATER VIDEO HOUSINGS AND IMAGING SYSTEMS WITH LIGHT CONTAMINATION MITIGATION

CROSS REFERENCE TO RELATED APPLICATIONS

This application is a continuation of and claims priority to co-pending U.S. Utility patent application Ser. No. 16/102,645, entitled UNDERWATER VIDEO HOUSINGS AND IMAGING SYSTEMS WITH LIGHT CONTAMINATION MITIGATION, filed Aug. 13, 2018, which claims priority under 35 U.S.C. § 119(e) to U.S. Provisional Patent Application Ser. No. 62/561,144, entitled UNDERWATER VIDEO HOUSINGS WITH LIGHT CONTAMINATION MITIGATION, filed Sep. 20, 2017, and to U.S. Provisional Patent Application Ser. No. 62/545,953, entitled UNDERWATER VIDEO HOUSINGS WITH LIGHT CONTAMINATION MITIGATION, filed Aug. 15, 2017. The content of each of these applications is incorporated by reference herein in its entirety for all purposes.

FIELD

This disclosure relates generally to underwater housings for video cameras and lights. More specifically, but not exclusively, the disclosure relates to housings with features for mitigating internal light contamination at mating surface boundaries to improve optical quality of video or other imaging by reducing contamination from lighting elements within the housing.

BACKGROUND

Housings for still or video cameras are used for underwater imaging as well as in other applications where imaging in environments with liquids, high humidity, corrosive materials, and other difficult environments is required.

Housings of this kind have been used for decades in applications such as undersea photography, film making, oceanography, oil exploration, as well as in high pressure environments, wells, liquid filled tanks and machinery, and various other difficult environments.

Many applications use separate housings for imaging elements (e.g., still or video cameras) and lighting elements (e.g., halogen, incandescent, or more recently LED lights). However, some housing applications require or benefit from or require combining imaging and lighting in a single device or housing (e.g., to minimize overall size, reduce complexity, provide shared signaling, power, and/or control, as well as for other reasons). Existing housings for combined camera and light use typically have multiple ports/windows, with separate ports for cameras or other imaging elements and lights. This leads to more complex, expensive, and structurally weaker housings. Existing housings that use a single port suffer with problems due to internal reflections of light from the light sources (e.g., LEDs) that contaminate the external light being directed to the camera.

Accordingly there is a need to address the above as well as other problems in the art to provide improved housings for imaging and other optical applications that combine imagers and lighting elements in proximity to cameras or imagers.

SUMMARY

This disclosure relates generally to underwater housings for video cameras and lights. More specifically, but not exclusively, the disclosure relates to housings with features for mitigating internal light contamination at mating surface boundaries to improve optical quality of video or other imaging by reducing contamination from lighting elements within the housing that provide light to areas outside the housing.

For example, in one aspect the disclosure is directed to an integrated underwater imaging device or system. The imaging device may include, for example, a camera including an imager or other image sensing element for converting input light into analog or digital image signals. The imaging device may also include an integral transparent optical port. The optical port may have flat polished inner and/or outer mating surfaces. The optical port allows at least part of the light from a light source within the housing to exit the housing to illuminate an exterior area of interest. The optical port further allows light external to the housing to be directed to the camera/imager which is positioned within the housing so as to generate the analog or digital image signal from the incoming light. The imaging device may include one or more LED or other type of light sources. The light source(s) may be positioned in the housing back from the integral transparent optical port inner mating surface. One or more light pipes, such as, for example, cylindrical shaped optical waveguides or other light pipe structures, positioned in the housing between the LED light sources and the transparent optical port inner mating surface. The imaging device may include a housing body. The housing body may have a mating surface adjacent to the port inner mating surface. The housing body may include one or more internal volumes for containing the LED light sources for providing the light output. The LED light sources may include one or more LEDs. The one or more LEDs may be discrete or may be in a two or three-dimensional array. The LED light sources may be driven by an LED light engine or other driver circuitry. The housing body may include one or more internal volumes for containing the camera. The imaging device may include a port retaining element for positioning and retaining the port to or within the housing body. The imaging device may include a first and/or a second elastomeric optically absorbent material, having a substantially uniform thickness and a width to thickness ratio greater than 10 to 1, for absorbing light reflections within the port. The first optically absorbent material may be positioned and retained in optical contact with an outer mating surface of the port. The second optically absorbent material may be positioned and retained in optical contact with an inner mating surface of the port. The first and/or second optically absorbent materials include a plurality of light transmission openings through which light from the light source exits the housing and light exterior to the housing enters the housing to be directed to the camera.

In another aspect, the disclosure is directed to an integrated camera housing. The integrated camera housing may include, for example, an integral transparent optical port. The optical port may have flat polished inner and/or outer mating surface. The optical port allows at least part of the light from a light source within the housing to exit the housing to illuminate an exterior area of interest. The optical port may also allow light exterior to the housing to be directed to a camera within the housing for imaging or other light signal reception and/or processing. The camera housing may include a housing body or structural support. The housing body may have a mating surface adjacent to the port inner mating surface. The housing body may include one or more internal volumes for containing one or more light sources for providing the light output. The housing body may include one or more internal volumes for containing the camera, electronics, and/or other device elements. The integrated camera housing may include a port retaining element for positioning and retaining the port to or within the housing body. The integrated camera housing may include first and/or second optically absorbent materials for absorbing light reflections within the port. If used, the first optically absorbent material may be positioned and retained in optical contact with the outer mating surface of the port and, if used, the second optically absorbent material may be positioned and retained in optical contact with the inner mating surface of the port. The first and/or second optically absorbent materials may include a plurality of light transmission openings through which light from the light source exits the housing and light exterior to the housing enters the housing to be directed to the camera.

Various additional aspects, features, and functions are described below in detail in conjunction with the appended Drawing.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
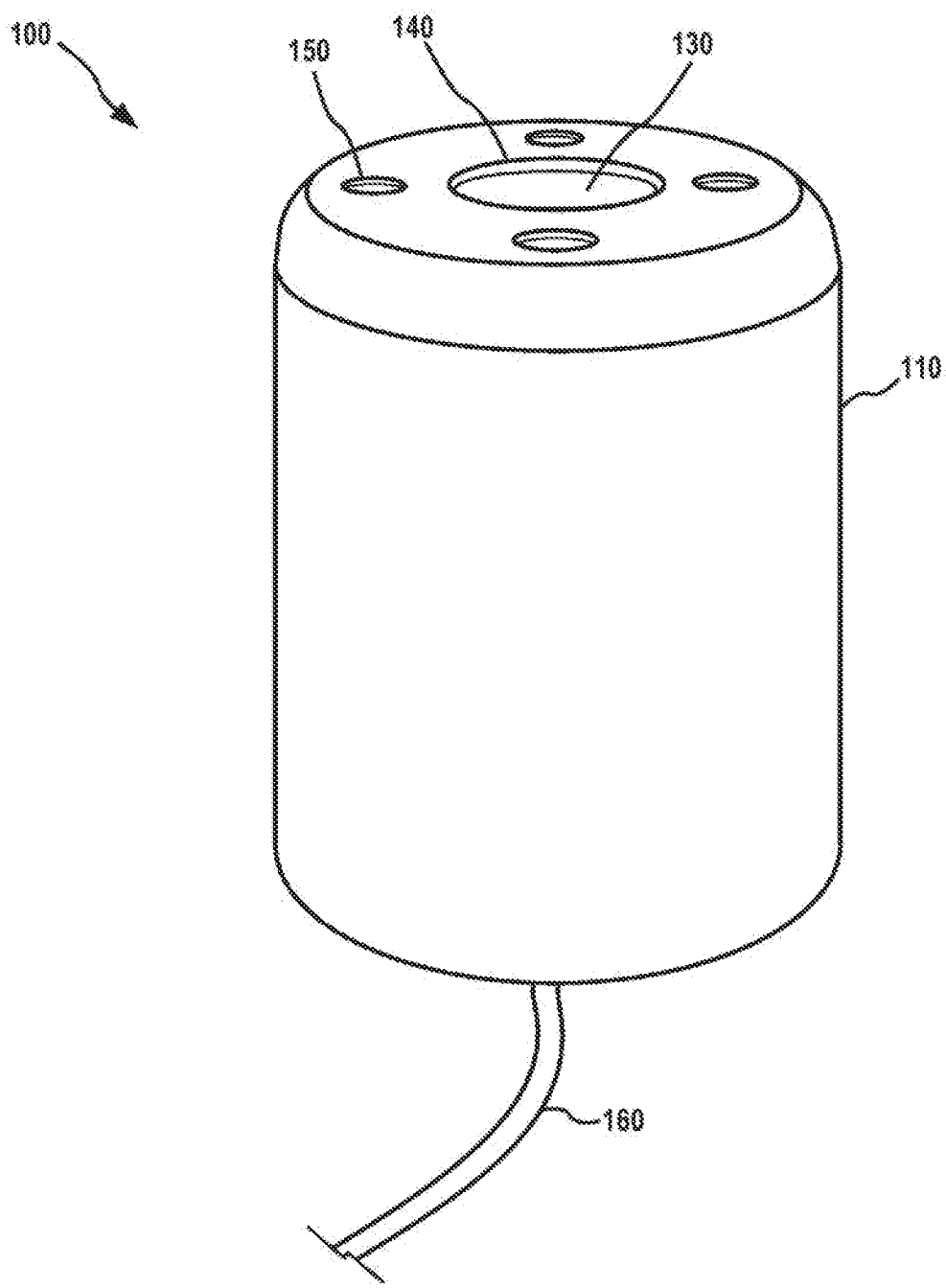
FIG. 1 illustrates details of one embodiment of a housing with internal light contamination mitigation using an optically absorbent elastomeric layer adjacent to an integral port.

This disclosure relates generally to underwater housings for video cameras and lights. More specifically, but not exclusively, the disclosure relates to housings and associated imaging systems with features for mitigating internal light contamination at mating surface boundaries to improve optical quality of video or other imaging by reducing contamination from lighting elements within the housing that provide light to areas outside the housing.

For example, in one aspect the disclosure is directed to an integrated underwater imaging device or system. The imaging device may include, for example, a camera including an imager or other image sensing element for converting input light into analog or digital image signals. The imaging device may also include an integral transparent optical port. The optical port may have flat polished inner and/or outer mating surfaces. The optical port allows at least part of the light from a light source within the housing to exit the housing to illuminate an exterior area of interest. The optical port further allows light external to the housing to be directed to the camera/imager which is positioned within the housing so as to generate the analog or digital image signal from the incoming light. The imaging device may include one or more LED or other type of light sources. The light source(s) may be positioned in the housing back from the integral transparent optical port inner mating surface. One or more light pipes, such as, for example, cylindrical shaped optical waveguides or other light pipe structures, positioned in the housing between the LED light sources and the transparent optical port inner mating surface. The imaging device may include a housing body. The housing body may have a mating surface adjacent to the port inner mating surface. The housing body may include one or more internal volumes for containing the LED light sources for providing the light output. The LED light sources may include one or more LEDs. The one or more LEDs may be discrete or may be in a two or three-dimensional array. The LED light sources may be driven by an LED light engine or other driver circuitry. The housing body may include one or more internal volumes for containing the camera. The imaging device may include a port retaining element for positioning and retaining the port to or within the housing body. The imaging device may include a first and/or a second elastomeric optically absorbent material, having a substantially uniform thickness and a width to thickness ratio greater than 10 to 1, for absorbing light reflections within the port. The first optically absorbent material may be positioned and retained in optical contact with an outer mating surface of the port. The second optically absorbent material may be positioned and retained in optical contact with an inner mating surface of the port. The first and/or second optically absorbent materials include a plurality of light transmission openings through which light from the light source exits the housing and light exterior to the housing enters the housing to be directed to the camera.

In another aspect, the disclosure is directed to an integrated camera housing. The integrated camera housing may include, for example, an integral transparent optical port. The optical port may have flat polished inner and/or outer mating surface. The optical port allows at least part of the light from a light source within the housing to exit the housing to illuminate an exterior area of interest. The optical port may also allow light exterior to the housing to be directed to a camera within the housing for imaging or other light signal reception and/or processing. The camera housing may include a housing body or structural support. The housing body may have a mating surface adjacent to the port inner mating surface. The housing body may include one or more internal volumes for containing one or more light sources for providing the light output. The housing body may include one or more internal volumes for containing the camera, electronics, and/or other device elements. The integrated camera housing may include a port retaining element for positioning and retaining the port to or within the housing body. The integrated camera housing may include first and/or second optically absorbent materials for absorbing light reflections within the port. If used, the first optically absorbent material may be positioned and retained in optical contact with the outer mating surface of the port and, if used, the second optically absorbent material may be positioned and retained in optical contact with the inner mating surface of the port. The first and/or second optically absorbent materials may include a plurality of light transmission openings through which light from the light source exits the housing and light exterior to the housing enters the housing to be directed to the camera.

The first and/or second of the optically absorbent materials may, for example, comprise a paint. The paint may be a black paint or darkly colored paint. The paint may have a matte or other anti-reflective, optically absorbent surface finish. The first and/or second of the optically absorbent materials may comprise a thin elastomeric material. The thin elastomeric material may be an optical black material or other light attenuation/absorption material. The first and/or second of the optically absorbent material may comprise an optically absorbent adhesive. The adhesive may be a black adhesive or darkly colored adhesive. The paint or other optically absorbent materials may sprayed onto the port surfaces. The port may be masked prior to painting to form light transmission opening(s) where the mask is placed. The elastomeric material may be a darkly colored optically absorbent rubber material. The elastomeric material may be a darkly colored optically absorbent synthetic rubber material. The first and/or second of the optically absorbent materials may comprise a flat optically absorbent gasket material and a thin optically absorbent adhesive positioned between the gasket material and the inner and/or outer port mating surface. The gasket material may be a dark or black paper material. The dark or black paper material may have an optically attenuating surface finish. The gasket material may be a dark or black plastic material. The adhesive may be a dark or black adhesive.

The integrated camera housing may, for example, include a layer of silicon grease or other optical coupling material between sides of one or more of the elastomeric materials and the port to increase optical coupling between the port and the elastomeric material(s). The transparent port may comprise a sapphire material. The transparent port may comprise a glass material. The transparent port may comprises an acrylic or other plastic material.

The integrated camera housing may, for example, include the camera or other image sensor. The camera may include an optical element/assembly, an imaging element, and/or other elements such as signal processing electronic circuitry, light driver circuitry, camera control circuitry, power supplies, and/or other electronics or optical elements. The housing may include the lighting element and the camera, wherein the lighting element includes a plurality of LEDs spaced around the camera. The plurality of LEDs may be arranged in a circular array. The plurality of LEDs may be arranged in a rectangular grip array. The plurality of LEDs may consist of six LEDs.

The integrated camera housing may, for example, include a lip feature. The lip feature may be shaped to retain the first optical absorbent material in close optical contact with the integral optical port. The port retaining element and/or housing may comprise stainless steel. The housing body may be shaped and have structural material/features sized to withstand deep external ocean pressures at depths of 1000 feet or more, 5000 feet or more, 10,000 feet or more, and 20,000 feet or more. The housing may comprise titanium and the port may comprises sapphire.

The integrated camera housing light source may, for example, be spaced apart from the transparent optical port. The housing may further include a light channeling element positioned between the light source and the transparent optical port. The light channeling element may be shaped and sized to direct light output from the light source to the transparent optical source so as to limit the cross-sectional area of the light at the transparent optical port surface. The light channeling element may comprise one or more light pipes. The light pipes may be cylindrical tubes or other optical transmission structures. The light channeling element may comprises an optical waveguide(s). The light channeling element may comprise an optical fiber bundle. The light channeling element may comprise a relay lens. The relay lens may comprise a single lens. The relay lens may comprise a lens group.

Various additional aspects, features, and functions are described below in conjunction with the appended drawing figures.

It is noted that the following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

Example Embodiments

Various additional aspects, features, and functions are described below in conjunction with the embodiments shown in FIG. 1 through FIG. 10 of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

FIG. 1 illustrates details of a simplified example embodiment 100 of a housing enclosing a camera and a light source (denoted herein as an integrated light and camera housing or simply an "integrated housing" for brevity). Integrated housing 100 includes a housing body 110, an integral port or window 130, and a port retaining element 140 positioned in front of the port 130 and coupled to the housing body 110 (additional elements are omitted from the figures for clarity; however, typical integrated housings include additional internal and external mechanical hardware, optical elements, electronics such as analog and/or digital circuitry, processing elements, power supplies or batteries, and other mechanical, electrical, and optical components).

A typical integral port comprises a flat circular disc of an optically transparent material, with highly polished surfaces on one or (typically) both sides. Ports may be made of a variety of materials such as sapphire, glass, acrylic, and the like. Stronger materials like sapphire are typically used in housings for operation in deep ocean environments (e.g., below 1000 meters), while housings for shallower applications commonly use materials such as glass, acrylic, or other plastics.

Housing, port, and other system components and designs for deep ocean/high pressure applications may be combined with the disclosures herein additional implementations. See, for example, Applicant's own prior US patents and applications such as U.S. Pat. No. 4,683,523, entitled DEEP SUBMERSIBLE LIGHT ASSEMBLY, issued Jul. 28, 1987, U.S. Pat. No. 4,996,635, entitled DEEP SUBMERSIBLE LIGHT ASSEMBLY WITH DRY PRESSURE DOME, issued Feb. 26, 1991, U.S. Pat. No. 6,697,102, entitled BORE HOLE CAMERA WITH IMPROVED FORWARD AND SIDE VIEW ILLUMINATION, issued Feb. 24, 2004, U.S. Pat. No. 8,033,677, entitled DEEP SUBMERSIBLE LIGHT WITH PRESSURE COMPENSATION, issued Oct. 11, 2011, U.S. Pat. No. 8,164,468, entitled LED LIGHTING FIXTURES WITH ENHANCED HEAT DISSIPATION, issued May 1, 2012, U.S. Pat. No. 8,172,434, entitled SUBMERSIBLE MULTI-COLOR LED ILLUMINATION SYSTEM, issued May 8, 2012, U.S. Pat. No. 8,616,725, entitled LED SPHERICAL LIGHT FIXTURES WITH ENHANCED HEAT DISSIPATION, issued Dec. 31, 2013, U.S. Pat. No. 8,616,734, entitled LED ILLUMINATION DEVICES AND METHODS, issued Dec. 31, 2013, U.S. Pat. No. 9,285,109, entitled SUBMERSIBLE LIGHT FIXTURE WITH MULTILAYER STACK FOR PRESSURE TRANSFER, issued Mar. 15, 2016, U.S. Pat. No. 9,388,973, entitled SUBMERSIBLE LIGHTS WITH PRESSURE COMPENSATION, issued Jul. 12, 2016, U.S. Pat. No. 9,429,301, entitled SEMICONDUCTOR LIGHTING DEVICES AND METHODS, issued Aug. 30, 2016, U.S. Pat. No. 9,506,628, entitled SEMICONDUCTOR LIGHTING DEVICES AND METHODS, issued Nov. 29, 2016, U.S. Pat. No. 9,810,332, entitled PRESSURE RELIEF VALVE DEVICES AND METHODS, issued Nov. 7, 2017, U.S. patent application Ser. No. 15/894,868, entitled UNDERWATER LIGHTS WITH PORT WINDOWS INCLUDING LENS FEATURES FOR PROVIDING TAILORED OUTPUT BEAMS, filed Feb. 12, 2018, and U.S. patent application Ser. No. 16/000,635, entitled DEEP WATER ENCLOSURES FOR LIGHTING AND IMAGING, filed Jun. 6, 2018. All of the above-referenced patents and patent applications are incorporated by reference herein. Various embodiments of high pressure housings and imaging systems for underwater or other applications may be realized with combinations of the aspects and elements of these various disclosures in combination with the disclosures herein. One or more claims may include combinations of the teachings of these incorporated disclosures with the further teachings detailed herein.

Light generated within the integrated housing 100 via light generation elements such as electrical circuits, light emitting diodes (LEDs), other optoelectronics, or other light generation circuits and associated devices as known or developed in the art (not shown in FIG. 1, but example lighting elements in the form of LEDs are shown as elements 540 in FIG. 5A and FIG. 5B) exits the housing through one or more openings 150 (four in the example embodiment 100 as shown in FIG. 1) to illuminate an area of interest external to the housing 100. The exiting light passed through the integral port while going out of the housing.

Figure 5A:
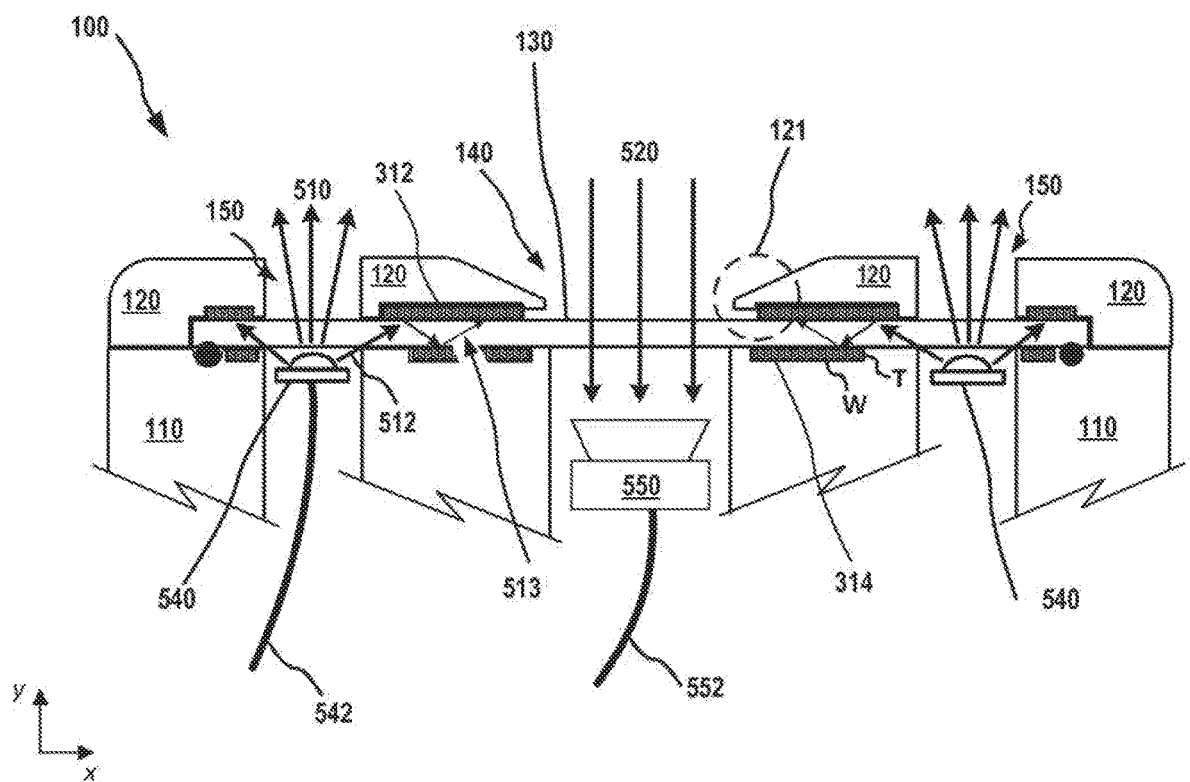
FIG. 5A illustrates details of the front end of the integrated housing embodiment of FIG. 1.
Figure 5B:
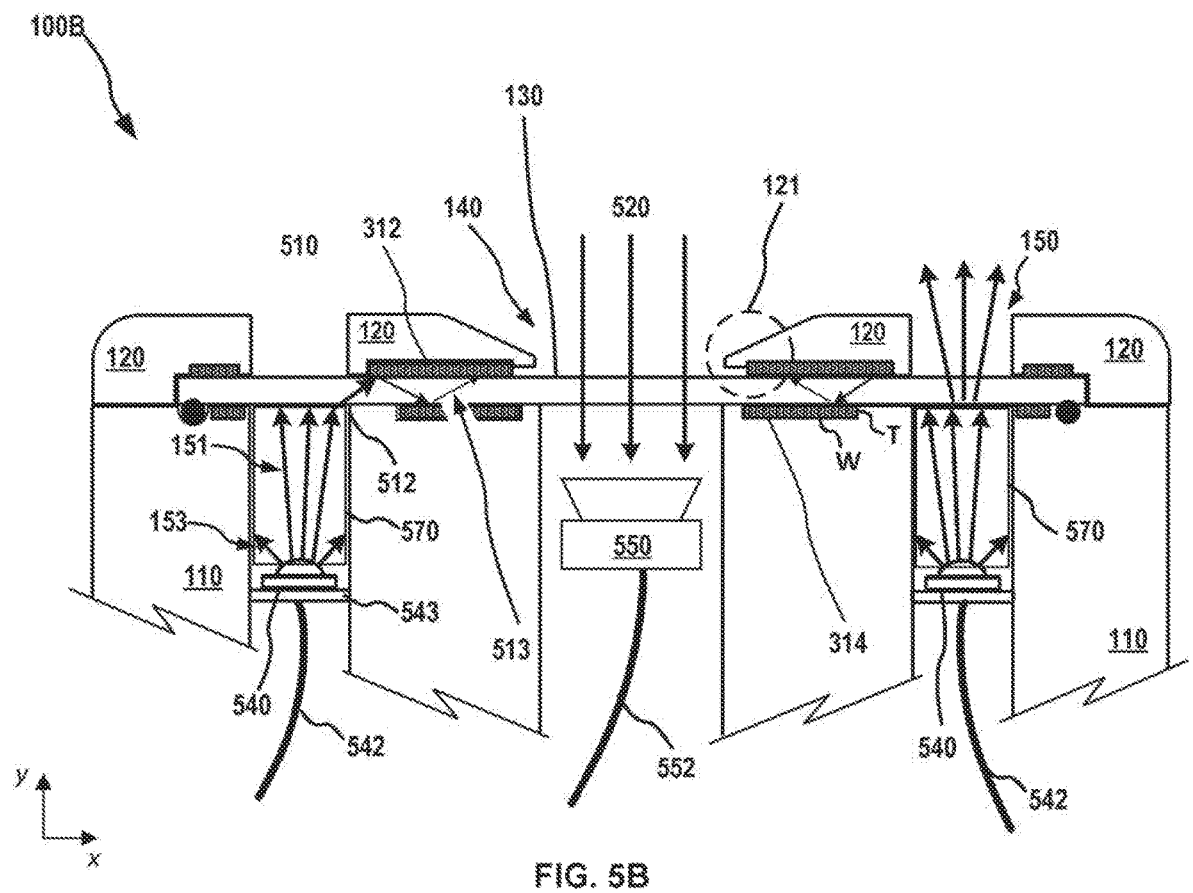
FIG. 5B illustrates details of another embodiment of a front end of an integrated housing embodiment.

In addition, a camera with optics and/or other imaging elements or sensors, may be positioned within the housing 100 (not shown in FIG. 1 but illustrated as camera and optics 550 in FIG. 5A and FIG. 5B). Example cameras may be visible light sensitive cameras, infra-red cameras, ultraviolet cameras, broad-spectrum cameras, or other imaging devices or light sensing devices for capturing images, video, or performing other light sensing or measurement operations. In operation, the camera receives external light coming into the housing, via opening 140, and processes the received light to generate images, video, optical instrumentation information, and the like. Incoming light also passes through the integral port. Depending on the relative spacing of the light openings, as well as the thickness of the port and other parameters, internal light reflections in the port can contaminate the incoming light, thereby decreasing imaging quality from the image sensors.

A typical embodiment uses multiple LEDs within the housing 100 and behind port 130 to generate the emitted light. The LEDs may be discrete devices spatially separated or may be in other configurations, such as circular or rectangular LED arrays. Additional light control/focusing elements (not shown in FIG. 1, but illustrated as element 723 in FIG. 8) may be used to control the shape and/or direction of light coming from the LEDs as it is provided to the external areas being imaged. LEDs may be visible light LEDs in one or more colors, and in some applications may be UV LEDs, IR LEDs, or LEDs or other light-emitting devices operating in the visible light spectrum and/or at higher or lower wavelengths. Compatible optical and other materials for use with non-visible light applications may be used for window ports, cameras, and/or other elements in various embodiments.

In typical applications, the light source(s) may be positioned back from the port to allow for mounting on a heat sink, MCPCB circuit board, or other heat conductor, to allow dissipation of heat (e.g., high output LEDs, while being significantly more efficient than earlier incandescent lighting elements, still generate significant heat when operated). In applications where LEDs or other light sources are spaced back from the port, an optical channel or conduit, such as in the form of a light pipe, internally reflective light tube, relay lens, fiber optic bundle, or other light conductive element or optical waveguide, may be used to provide a large percentage of generated light to the inner surface of the port. A light pipe or similar optical element may also be used to limit the maximum exit angle of the light presented to the integral port, and may also help reduce inter reflections.

Figure 8:
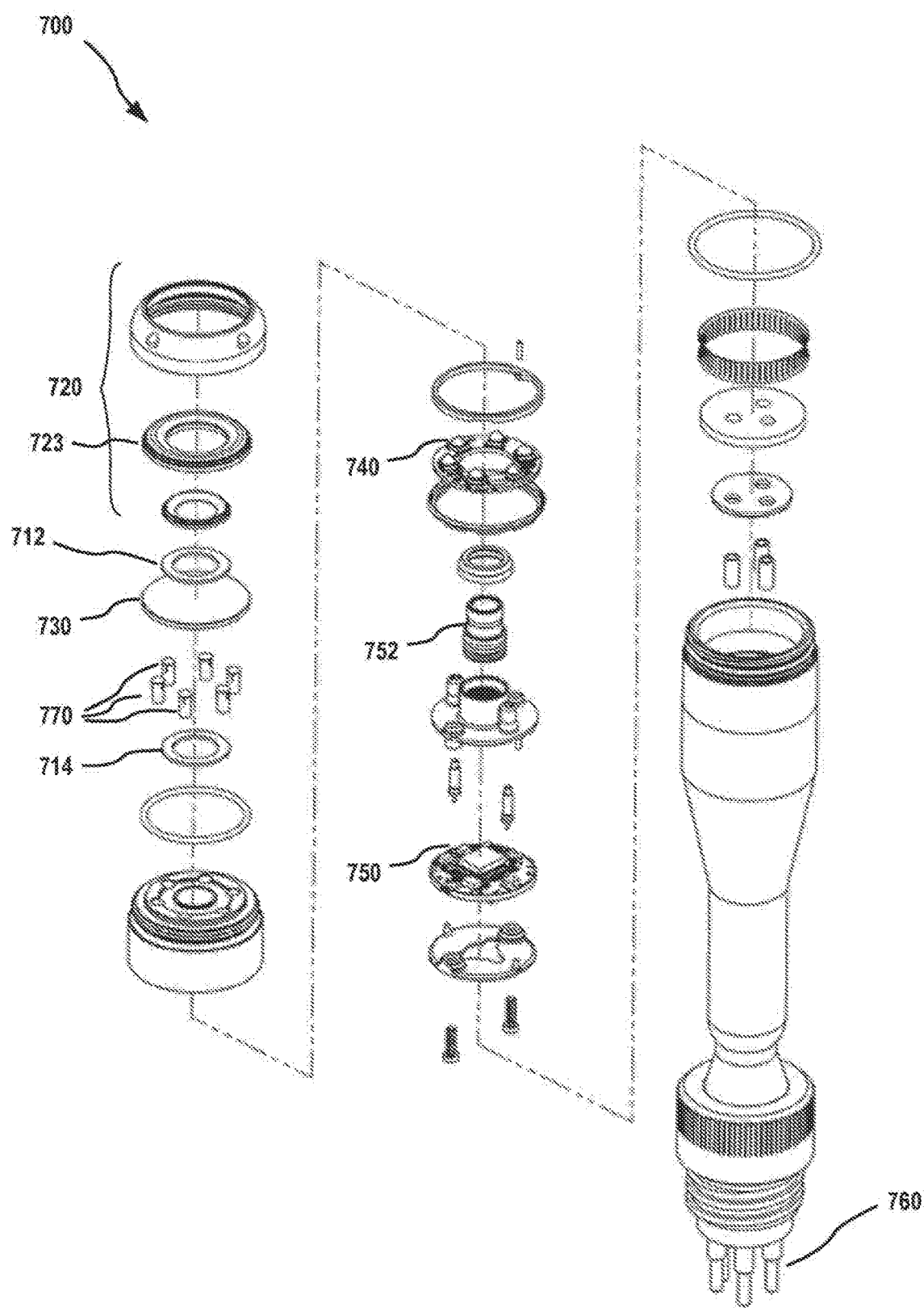
FIG. 8 illustrates details of the interior of the embodiment of FIG. 7 in exploded view.

In an exemplary embodiment, a light pipe associated with each LED (or other light source), such as light pipes 570 as shown in FIG. 5B, or light pipes 770 as shown in FIG. 8, may be used to provide most of the output light generated by an associated LED (i.e., LEDs 540 of FIG. 5B or LEDs 740 of FIG. 8) to the integral port and then to the external area being illuminated. Other embodiments may use, for example, reflective or highly polished hollow cavities, such as is used in light tubes or other optical waveguides, between the light sources and integral port to maximize light delivery to the port.

A typical camera includes one or more imaging sensors and associated optics, also within the housing 100 and positioned behind port 130, to generate images or video of a scene of interest. A cable or umbilical 160 may be fixed to or removably coupled to the housing to provide power and control signaling to the camera, lights, other electronics in the housing, etc., as well as to carry images, video, instrumentation data, and the like from the housing to a separate device, such as a remote operated vehicle (ROV), submarine, boat, or equipment on shore or in other locations (not shown in FIG. 1) remote from the integrated housing 100.

While some housing designs use multiple ports, with separate ports for output lighting and incoming light for imaging, a single integral port such as port 130 may be advantageously used in various embodiments to simplify camera design and maintenance, reduce size, provide higher strength for deep-ocean or other high external pressure applications, or for other application-specific reasons. As used herein, a single integral port refers to a single disc, sheet, or other shape of transparent material which passes light both out of the housing from internal sources, and into the housing for imaging by a camera or for other optical applications. A typical port will be disc-shaped as shown in the figures, but other shapes may be used in alternate embodiments. Some embodiments may use two or more integral ports, with each of the ports sharing at least one output light path and input light path.

As noted previously, a disadvantage of a single port which transmits both internally generated light to illuminate an exterior area as well as incoming light to be imaged, is optical contamination due to internal reflection of the outgoing light to the camera or other imaging or optical sensor. Put another way, some light from an internal light source, often at relatively high optical power levels, can be reflected/bounced within the thickness of the port, and some of this can further be directed towards the camera lens (or other optical input), creating glare, bright spots, or other optical contamination on images or video generated by the camera. This internal reflection in the port may be reduced or eliminated as described herein through use of optically absorbent, optical attenuation materials and associated placement in close optical contact with a highly polished port surface.

Various embodiments as disclosed herein may use an optical absorbent material layer on one, or preferably both, sides of the single integral port (also referred to simply as a "port" herein for brevity) to attenuate reflections within the port. The optical absorbent material may be painted or otherwise applied as a coating to the port, or may be an elastomeric material layer, such as dark colored rubber or other optical absorbent films, to absorb light reflection within the port between the position of the LEDs or other light sources in the housing and the position of the camera or other imaging sensor or optical device. In order to maximize optical attenuation, the rubber or other absorbent material is preferably closely optically coupled to the port, and the port mating surfaces are highly polished to maximize contact. Additional thin layers, such as a layer of silicon grease or other optical coupling materials, may also be used between the rubber or other elastomeric material layer and the port to further increase optical coupling and reflection attenuation.

Some embodiments may use one or more of a thin non-elastomeric layer of optical attenuation material, optical grease, and an elastomeric sheet to even out loading in high pressure applications. Low cost embodiments may use a black label or sticker of optical attenuation material with a very think adhesive layer or optical grease layer to provide optical conductivity and/or adhesion to the integral port surface.

Figure 2:
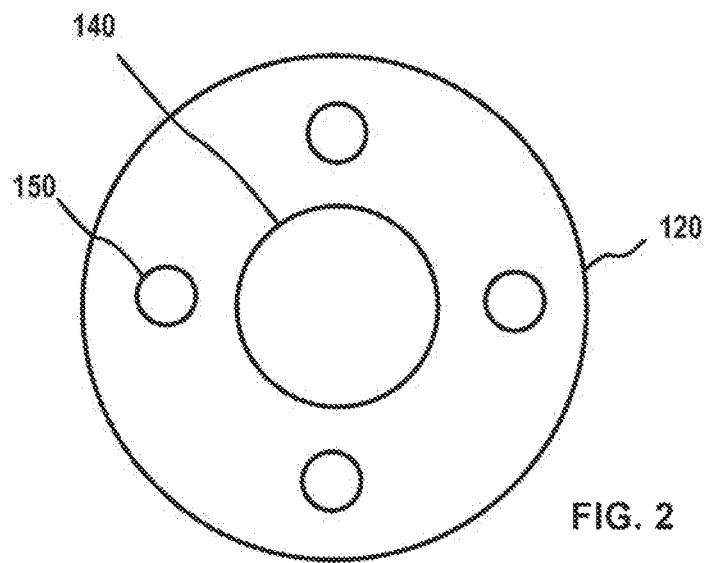
FIG. 2 illustrates details of an embodiment of a port retaining element seen in frontal view.
Figure 3:
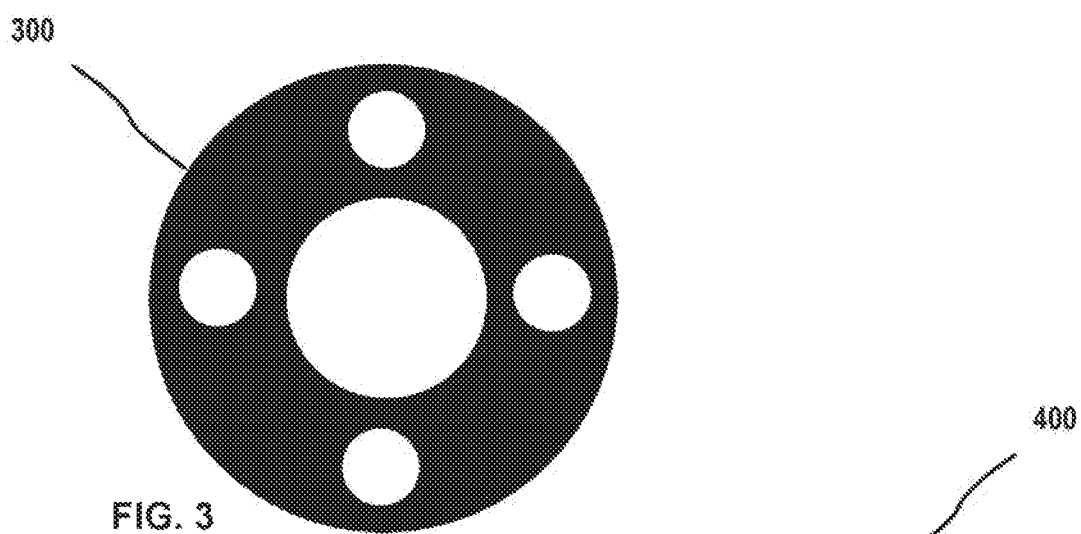
FIG. 3 illustrates details of an embodiment of an optically absorbent material layer in the form of a thin dark rubber sheet.
Figure 4:
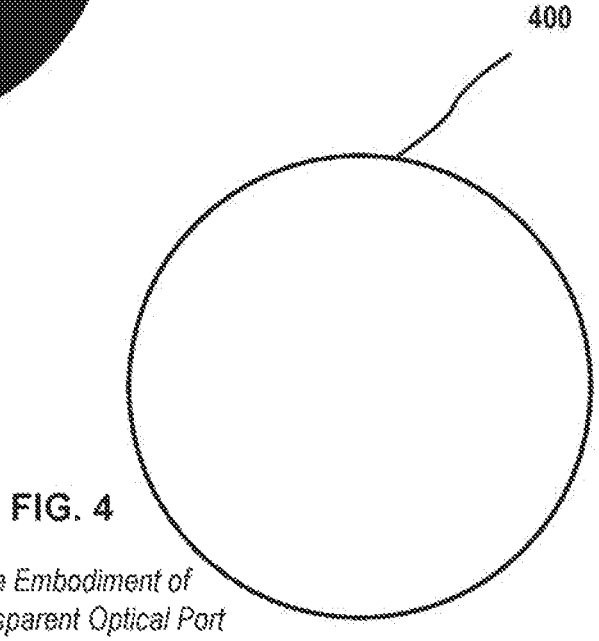
FIG. 4 illustrates details of an embodiment of an integral transparent optical port.

FIG. 2 illustrates a view of the port retaining element 120 of housing 100 as seen looking directly into the front or forward end of the integrated housing (shown on the top of the housing in FIG. 1). An optical absorbent layer, for example, a rubber film layer 300 as shown in FIG. 3, may be positioned below port retaining element 120 in close optical contact with a clear transparent optical port, such as port embodiment 400 as shown in FIG. 4. Port embodiment 400 may be a highly polished transparent sapphire disk; however, other transparent port materials may be used for alternate embodiments, such as glass, acrylic, and the like. Sapphire material is particularly well suited for the high pressures of deep ocean use for deep sea applications such as oceanography and oil exploration (e.g., below 1000 feet), but other materials, shapes, and sized may be used for various other embodiments that don't require extreme high pressure strength.

The optical absorbent layer 300 may be positioned and in close contact to one side, or preferably two absorbent layers may be used on both sides of the port 400. The absorbent layer 300 may be shaped in accordance with the relative positioning of the lighting elements and the camera in the integrated housing so as to provide maximum absorbent material in parts within the port between the lights and the camera where light rays will be internally reflected towards the camera area.

Although the embodiment 300 illustrates a thin black rubber sheet or film with holes formed to allow light out from the lighting elements and light into the camera from the exterior, other shapes and sizes may be used in various embodiments. For example, in some embodiments linear rows or circular or other arrays of LEDs may be used; in these implementations the holes may be square or annular or otherwise shaped to conform to the optical array.

FIG. 5A and FIG. 5B illustrate additional details of aspects of the present invention as seen in a cutaway view looking through the side of the integrated housing embodiment of FIG. 1 (the cutaway view of FIG. 5A and FIG. 5B shows the top part of the integrated housing 100 in the same orientation as in FIG. 1, with various additional elements left out for clarity—FIG. 5B includes the additional element of light pipes 570).

As shown in FIG. 5A and FIG. 5B, a port retaining element 120 is positioned above a single integral port 130 (in the form of a disk as in FIG. 4, but shown in cross-section), with a housing body 110 positioned below the port 130. A first optical absorbent layer 312 is positioned between port 130 and port retaining element 120, and a second optical absorbent layer 314 is positioned between port 130 and housing 110. As noted previously, various shapes and sizes of optical absorbent layers may be used in various embodiments, and thicknesses of the port and the optical absorbent layers may be selected so as to maximize attenuation based on the size and geometry of a particular application. In the example embodiments shown in FIG. 5A and FIG. 5B, optical absorbent layers are used on both sides of the port 130; however, other embodiments may use only a single absorbent layer on the forward or rearward facing surface of the port depending on housing geometry, sized, and/or other application constraints. In order to maximize attenuation, the absorbent layer material should be in intimate direct contact with an optically polished port surface. While a transparent adhesive layer may be used in some embodiments, better light attenuation will typically occur with no adhesive layer and direct contact of the absorbent layer.

In operation, light rays 510 are generated by and emitted from a light generation element such as LEDs 540. Most of the rays 510 typically exit the housing through port 130 and openings 150 in port retaining element 120. Likewise, light rays 520 may enter the housing and be directed towards a camera and optics 550. Some of the light 510 may be internally reflected within the port 130, such as example rays 512 as shown in FIG. 5A and FIG. 5B. (It is noted that this embodiment is a simplified illustration and alternate or additional elements may be used in various embodiments. For example, port retaining element 120 may comprise several elements configured to retain the port within the housing and/or to seal it or otherwise mechanically position it for operation and allow light to pass into or out of the integrated housing. Additional elements, such as acrylic, glass, titanium, stainless steel elements, or other optical or structural elements may also be used between the port and the housing exterior.)

In order to reduce internal reflections in port 130, one or more optical absorbent layers, such as first optical absorbent layer 312 and/or second optical absorbent layer 314, may be positioned in close optical contact with polished interior and exterior surfaces of port 130 as shown in FIG. 5A and FIG. 5B. FIGS. 5A and 5B illustrate a cutaway views through openings 130 and 140 with optical absorbent layers 312 and 314 shown as separate segments; however, when viewed from the front or rear of the port they may be fabricated as a single sheet of absorbent material (e.g., optical black material), such as shown in FIG. 3, with cutouts or openings to allow light in and out of the port. Optical absorbent layers such as layers 312 and 314 are typically dimensioned to be thin (compared to the port thickness), have a substantially uniform thickness through the area of the layer (i.e., similar to a sheet of material or a washer-shape or other flat shape) and have a width dimension W (in the x-axis as shown in FIG. 5A, where the thickness, T, is in the y-axis) much greater than the thickness, T. Example width to thickness ratios are greater than 10 to 1, greater than 50 to 1, greater than 100 to 1, and greater than 1000 to 1. Optical absorbent layers of this type are distinguishable from well-known circular cross-section O-rings, which are used in various underwater devices to keep out water or gases but not to provide optical attenuation or mitigate internal reflections of light provided for external illumination.

FIG. 5B illustrates a similar embodiment 100B where the LEDs 540 are positioned back from the port within the housing, and additional light pipes 570 are positioned between the LEDs 540 and port 130 to direct all or most of the light from the LEDs to the port and then out to the external area being imaged. Other embodiments may use reflective light tubes or other optical waveguides in addition to or in place of light pipes 570.

Other embodiments may include multiple separate sheets or pieces of optical absorbent material, or absorbent materials sprayed or painted onto the port and/or adjacent housing and/or port retaining structures and positioned to be in close optical contact with the port. Silicon grease or other optical contact materials may be used to increase optical coupling between the port surfaces and the absorbent materials as long as they are very thin and act primarily to wet the surface.

In an exemplary embodiment, the absorbent material may be a thin dark rubber sheet cut or molded in the shape of the port and with holes or other cutouts corresponding to the optical output areas of the light elements and the optical input areas of the camera or other optical instrument. Other embodiments may comprise cutout washer-shaped discs such as discs 712 and 714 of FIG. 8, or other shapes depending on the particular arrangement of lights and associated imaging elements (the optical absorbent material should be shaped to be positioned between the light source output areas of the port and the imaging light input areas, preferably on both sides of the integral port.

Figure 6:
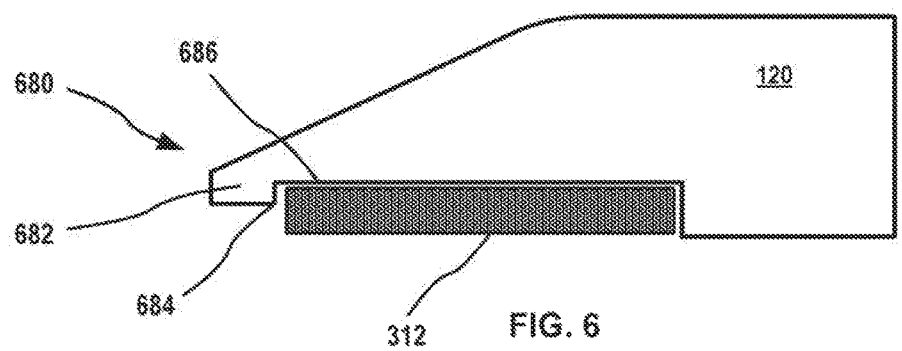
FIG. 6 illustrates details of an embodiment of a lip feature for retaining an optically absorbent material such as a think dark rubber layer in close optical contact with a transparent port.

If a sheet of material such as rubber or other elastomeric material is used, it may be retained in place against the port or other elements, such as the port retaining element, using mechanical structures such as formed grip edges as shown in the circular highlighted area 121 of FIG. 5A and FIG. 5B and as shown in further detail in FIG. 6.

Turning to FIG. 6, the port retaining element 120 may include a lip feature, such as lip feature 680, to retain the optical absorbent material, such as rubber sheet 312, in place relative to light paths through port 130 and in close optical contact with the surface of port 130 to attenuate reflected light with the port. In an exemplary embodiment, lip feature 680 includes a ramp section 682 extending beyond the edge of the rubber sheet 312, with an edge 684 and cutout area 686 to retain rubber sheet 312 in place, particular through multiple operations of assembling and disassembling of the integrated housing (as may be done, for example, in servicing between dives on an ROV, or in routine maintenance or repair.

Figure 7:
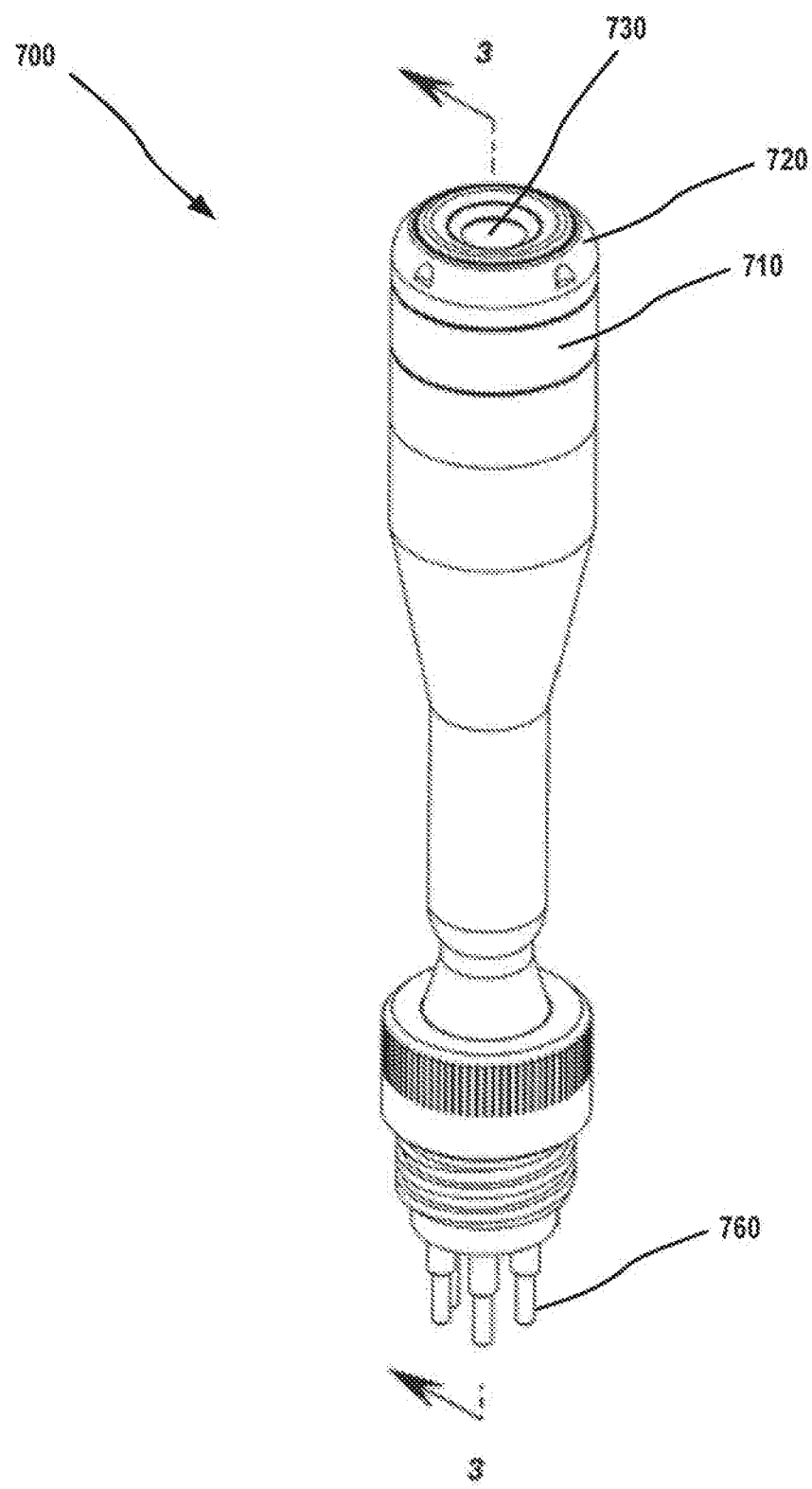
FIG. 7 illustrates details of the exterior of an embodiment of an integrated housing including a camera and LED lights.

FIG. 7 illustrates the exterior of an integrated housing embodiment 700, which may correspond in various features to those described previously with respect to FIGS. 1-6. Housing 700 includes an integral optical port 730, a port retaining element 720 (in this embodiment comprising several components as shown in further detail in FIG. 8), a housing body 710, and an electrical connector 760 for coupling signal and power wiring from the housing to an external devices such as control units, power supplies, and video monitors and recording devices (not shown). In some embodiments, such as is shown in FIG. 8, one or more light channels 770 may be used to direct light from the light sources (e.g., LEDs) to the inner surface of transparent window 730. For example, the light channels 770 may be tubes or bundles of optical fibers, relay lenses, or other mechanisms for directing light from a light source to the optical port 730. This may be advantageously used when the light source is positioned at a distance from the transparent optical port 730, such as is shown in FIG. 8. In an exemplary embodiment for deep water operation, a light channel in the form of a light pipe may advantageously limit the angle of light presented to the transparent port, for example by using additional light attenuation materials on the surfaces of the light channel, to attenuate light at less than a critical angle and provide light to the transparent port only at angles close to normal to the transparent port surface. In addition, a light channel, such as in the form of a light pipe or light tube or other optical waveguide, may, in some embodiments, provide additional mechanical support between the transparent optical port 730 and other structural elements. In other embodiments, such as, for example, the embodiment 100 shown in FIG. 5A, where the light sources (e.g., LEDs 540) are positioned close to or in contact with a transparent port (e.g., port 130), the light channel may be omitted and/or other mechanisms may be used to limit the angle of light provided to the transparent optical port.

FIG. 8 is an exploded view of the interior of the housing embodiment 700. Housing 700 includes a three component port retaining element 720 including an output light focusing ring 723, a first optical absorbent element 712 positioned when assembled in close optical contact with the forward surface of an integrated port 730, a second optical absorbent element 714, an array 740 of LED lights on a printed circuit board (PCB) spaced back from the port 730, a camera assembly including optics 752 and an imaging sensor 750 on another PCB, as well as various additional mechanical, optical, and electronics components as shown. A set of light pipes 770 are positioned between the LEDs 740 and port 730 to direct substantially all of the LED output light to the port.

Figure 9:
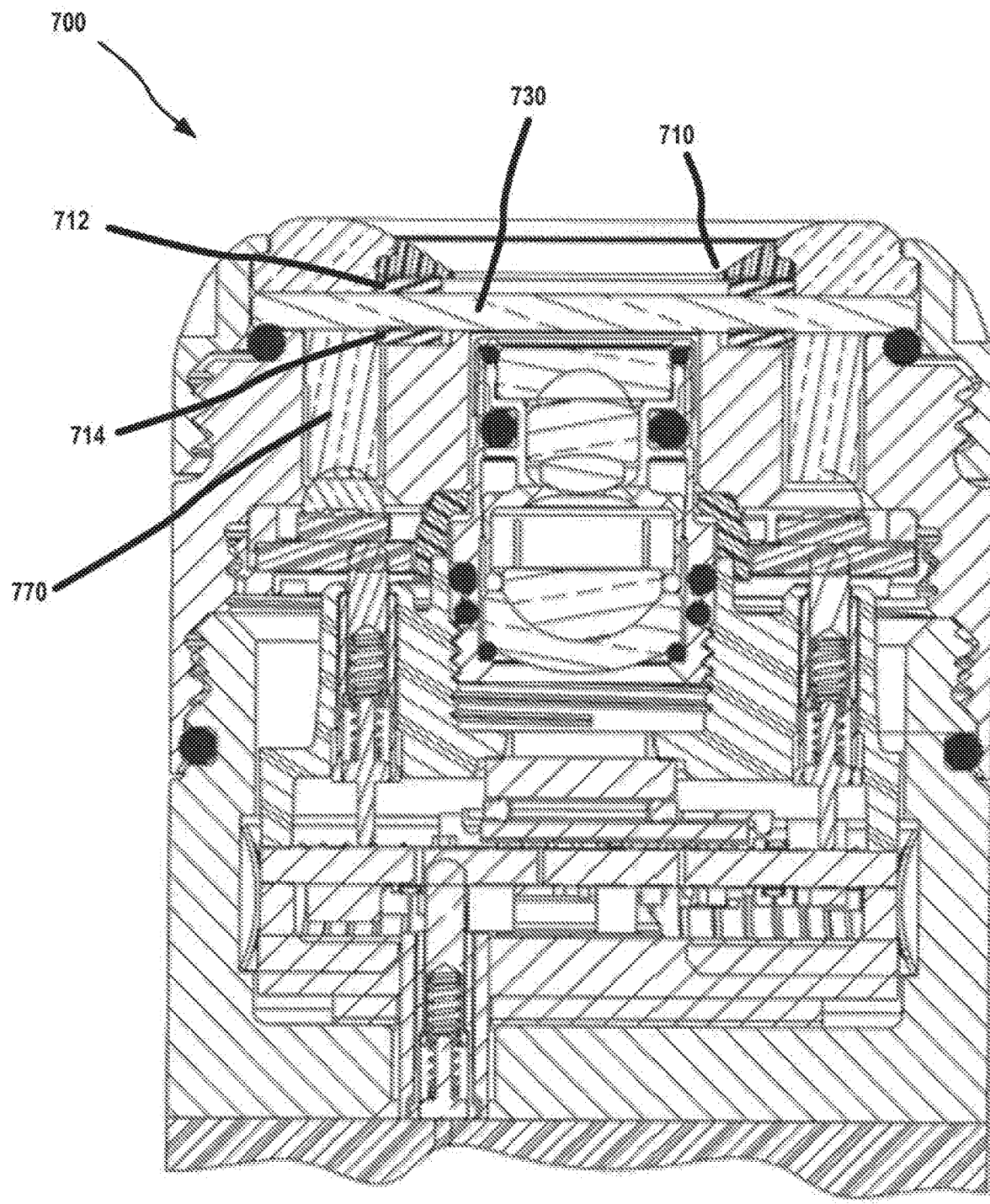
FIG. 9 illustrates details of the top end of the interior of the embodiment of FIG. 7 as assembled.

FIG. 9 shows details of the forward portion of the housing embodiment 700 in cutaway view as assembled. In particular, port 730 is shown positioned near the front of the housing with first and second optical absorbent elements 712 and 714, in the form of a dark rubber sheet material, positioned in close optical contact with respective sides of the port 130. A lip features 710 is shown as part of the port retaining element with an edge and recessed section to grip and contain the optical absorbent element 712 from movement during disassembly and reassembly.

Figure 10:
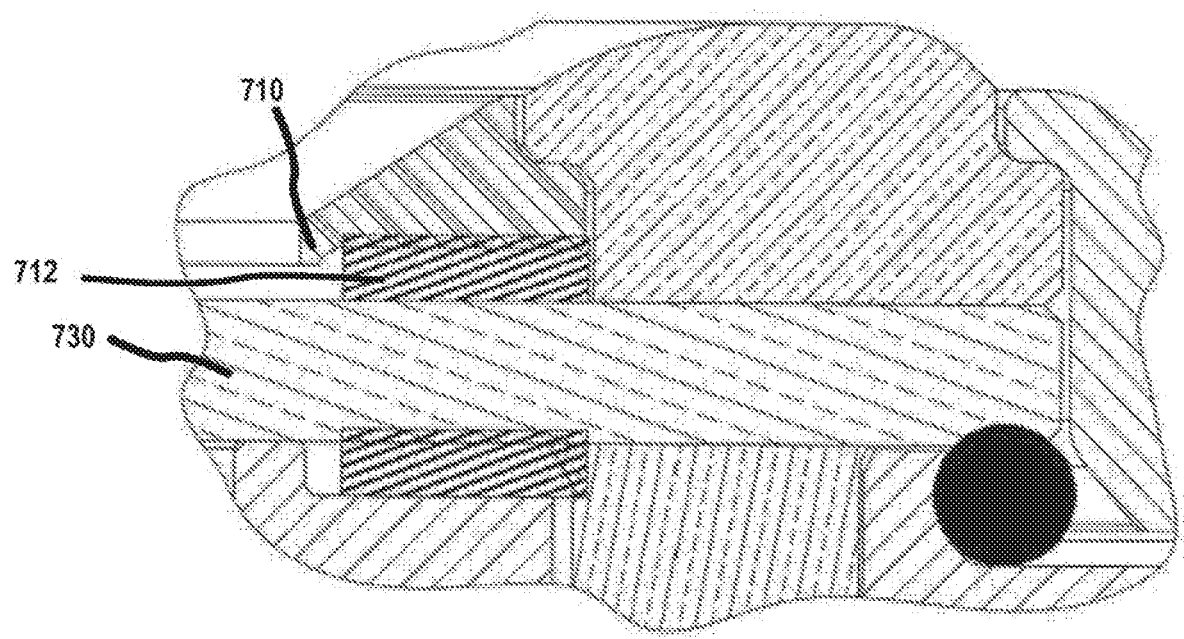
FIG. 10 illustrates details of a lip feature embodiment in the housing of FIG. 7.

FIG. 10 is an exploded view of the lip feature 710 of FIG. 9 showing retention of the optical absorbent element 712 in close optical contact with port 730 to attenuation internal reflections in the port 730 from the LEDs.

The scope of the invention is not intended to be limited to the aspects shown herein, but is to be accorded the full scope consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

It is noted that as used herein that the terms "component," "unit," "element," or other singular terms may refer to two or more of those members. For example, a "component" may comprise multiple components. Moreover, the terms "component," "unit," "element," or other descriptive terms may be used to describe a general feature or function of a group of components, units, elements, or other items. For example, an "RFID unit" may refer to the primary function of the unit, but the physical unit may include non-RFID components, sub-units, and such.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the present invention. Thus, the presently claimed invention is not intended to be limited to the aspects shown herein but is to be accorded the widest scope consistent with the appended claims and their equivalents.

We claim:

1. An integrated underwater imaging device, comprising:
a housing body;
an imaging sensor disposed within the housing body;
one or more transparent optical ports to allow light from a light source within the housing body to exit the housing body to illuminate an exterior area of interest, and light exterior to the housing body to be directed to the imaging sensor;
one or more light sources positioned in the housing body;
a mating surface on the housing body positioned adjacent to one or more optical port inner mating surfaces on one or more of the one or more optical ports; and
first and/or second optically absorbent materials for absorbing light reflections within the port;
wherein, if used, the first optically absorbent material is positioned and retained in optical contact with outer mating surfaces of one or more of the one or more optical ports; and
wherein, if used, the second optically absorbent material is positioned and retained in optical contact with the inner mating surfaces of one or more of the one or more optical ports.

2. An integrated camera housing, comprising:
a housing body;
one or more optical ports having inner and outer mating surfaces, wherein the one or more optical ports allows either light from a light source within the housing body to exit the housing body to illuminate an exterior area of interest, light exterior to the housing body to be directed to an imaging sensor within the housing, or both;
a mating surface on the housing body positioned adjacent to an inner mating surface of one or more of the one or more ports, the housing body including one or more internal volumes for containing one or more light sources for providing the light output and for containing the imaging sensor; and
first and/or second optically absorbent materials for absorbing light reflections within one or more of the one or more optical ports;
wherein, if used, the first optically absorbent material is positioned and retained in optical contact with the outer mating surface of one or more of the one or more optical ports; and
wherein, if used, the second optically absorbent material is positioned and retained in optical contact with the inner mating surface of one or more of the one or more optical ports.

3. The device of claim 1, wherein the light source comprises an LED light engine.

4. The device of claim 1 further including an optical waveguide, wherein output form the light source is directed to the port through the optical waveguide.

5. The device of claim 1, wherein the port comprises sapphire.

6. The device of claim 1, wherein the port comprises glass.

7. The device of claim 1, wherein the port comprises acrylic.

8. The device of claim 1, wherein the first and/or second optically absorbent material comprises an elastomeric material.

9. The device of claim 8, wherein the elastomeric material comprises rubber.

10. The device of claim 9, wherein the rubber is sheet rubber.

11. The device of claim 1, wherein the first and/or second optically absorbent material is in a washer-shaped disc.

12. The device of claim 1, wherein the first and/or second optically absorbent material comprises a sticker.

13. A light attenuating port assembly for use in a combined camera and light device, comprising
an optically transparent port, having inner and outer surfaces, for allowing light to pass inward through the port from the outer surface to an imaging sensor and light to pass outward through the port from the inner surface to illuminate an area being imaged by the imaging sensor; and
first and/or second optically absorbent materials for absorbing light reflections, wherein,
if used, the first optically absorbent material is positioned in optical contact with the outer surface of the optically transparent port, and wherein, if used, the second optically absorbent material is positioned in optical contact with the inner surface of the optically transparent port.

14. The assembly of claim 13, wherein the first and/or second optically absorbent material comprises an elastomeric material.

15. The assembly of claim 14, wherein the elastomeric material comprises rubber.

16. The housing of claim 2, further comprising the lighting element and the camera, wherein the lighting element includes a plurality of LEDs spaced adjacent to the camera.

17. The housing of claim 16, wherein the plurality of LEDs are arranged in a circular array around the camera lens.

18. The housing of claim 17, wherein the plurality of LEDs consist of six LEDs.

19. The housing of claim 16, wherein the plurality of LEDs are arranged in a rectangular grid array.

20. The housing of claim 2, wherein the housing body is shaped and sized to withstand deep ocean external pressures at depths of 1000 feet or more.

* * * * *